UNITED STATES PATENT OFFICE.

THEODOR SCHWEIZER, OF ZURICH, SWITZERLAND.

CONSERVATION OF VEGETABLE MATERIALS.

1,404,549.          Specification of Letters Patent.     Patented Jan. 24, 1922.

No Drawing.        Application filed March 31, 1921. Serial No. 457,511.

*To all whom it may concern:*

Be it known that I, THEODOR SCHWEIZER, a citizen of the Republic of Switzerland, residing at Zurich, Switzerland, have invented certain new and useful Improvements in the Conservation of Vegetable Materials, (for which I have filed an application in Switzerland October 20, 1919, Patent No. 85815;) and I do hereby declare the following to be a clear, full, and exact description of the invention, such as will enable others skilled in the art to which it appertains to make and use the same.

This invention relates to improvements in a process for the conservation of vegetable materials.

The object of the present process is to conserve green juicy feeding stuffs serving for feeding animals during winter time.

The process according to the present invention is carried out in the following manner:

The green sappy feeding plants to be conserved are first of all made conductors of electricity by means of a suitable treatment (by cutting, crushing and the like) whereby the epidermis or the outer protective layers of the plants are damaged and the thus treated material is rammed into containers. Then an electric current of a voltage and frequency existing in ordinary supply mains is passed through the bulk of the material in said container. The walls of the container being made of insulating material, whereas the floor of the container forms one electrode and the cover to be placed on the top of the material in the container acting as the other electrode. The electric current is caused to act upon the material during such a period of time until the resistance which amounts at the beginning of the treatment to 136–140 ohms has been almost totally overcome. If during the treatment more feeding stuff has to be filled into the container it is only necessary to remove the cover and to replace it again later on after the stuff has been filled in.

The current passing through the feeding stuff which has been made a conductor of electricity causes a very quick rise of the temperature inside the feeding stuff up to 50° C. and in consequence of this quick rise of the temperature all organic life of the micro-organisms is destroyed or at least weakened as the conditions of life are limited to a temperature of below 50° C. and the cells of the plants are destroyed as well. The whole mass within the container shrinks and the air contained in it is driven out.

With this process the considerable losses of feeding substance owing to the fermentation upon which the rise of the temperature depends in the hitherto known process are avoided and a product is obtained in which the formation of free acid is excluded so that the product will remain in the state of conservation for any length of time after the electric current has been switched off and after the product has cooled down. The moisture content of the material is without influence upon the final product, there are no losses of nutritive ingredients and the albumen remains intact. Technical residues as remains of fruits, slices of sugar-beet, distiller's wash, malt and the like can be kept sweet by means of the process according to the present invention, since it is known that fermentation only obtains at the expense of sugar and starch and fermentation with this process does not take place so that these feeding stuffs all remain conserved.

It is already known to conserve organic substances for instance food stuff such as meat, fruits, vegetables and the like by treating them with an electric current. In these known processes a constant, weak, direct current had to be used, the container had to be a good conductor of electricity and a filling up of the interstices between the fruits and the like to be conserved had to be effected by a solution acting as electrolyte for instance a sugar solution. Further induction currents and high frequency currents have been used, but in consequence of the high temperatures produced in these processes an undesirable modification of the products resulted. These processes cannot be advantageously used for conserving feeding stuff on a large scale. In none of the aforementioned processes use has been made of an electric current of a tension and of a frequency as is usually employed in supply mains and in which the products to be conserved are made a good conductor of heat so that they act themselves as an electrolyte.

I claim:

1. A process for the conservation of vegetable materials, comprising treating the material to be conserved so as to make it a conductor of electricity by damaging the epidermis of said material, and causing an electric current to pass through the bulk of the material, which acts itself as an electrolyte, for destroying all organic forms of life therein.

2. A process for the conservation of vegetable materials, comprising treating the material to be conserved so as to make it a conductor of electricity by mechanically damaging the epidermis of said material, ramming the material thus treated into a container, and causing an electric current of a voltage and a frequency that is used in ordinary supply mains to pass through the bulk of the material, which acts itself as an electrolyte, for destroying all organic forms of life therein.

In testimony that I claim the foregoing as my invention, I have signed my name.

THEODOR SCHWEIZER